(12) United States Patent
Delatte

(10) Patent No.: US 8,389,120 B2
(45) Date of Patent: Mar. 5, 2013

(54) SOUND-GENERATING GLAZING

(75) Inventor: Yves Delatte, Jumet (BE)

(73) Assignee: AGC Glass Europe, Brussels (BE)

( * ) Notice: Subject to any disclaimer, the term of this patent is extended or adjusted under 35 U.S.C. 154(b) by 643 days.

(21) Appl. No.: 12/095,925

(22) PCT Filed: Dec. 6, 2006

(86) PCT No.: PCT/EP2006/069372
§ 371 (c)(1),
(2), (4) Date: Apr. 1, 2010

(87) PCT Pub. No.: WO2007/065909
PCT Pub. Date: Jun. 14, 2007

(65) Prior Publication Data
US 2010/0215930 A1 Aug. 26, 2010

(30) Foreign Application Priority Data
Dec. 7, 2005 (EP) .................................... 05111774

(51) Int. Cl.
B32B 17/10 (2006.01)
H04R 11/04 (2006.01)

(52) U.S. Cl. ..................... 428/415; 428/417; 428/425.6; 428/426; 381/152; 381/431

(58) Field of Classification Search ........................ None
See application file for complete search history.

(56) References Cited

U.S. PATENT DOCUMENTS

| 6,132,882 | A | 10/2000 | Landin et al. | |
| 6,887,577 | B1 | 5/2005 | Keller et al. | |
| 2002/0044668 | A1* | 4/2002 | Azima | 381/152 |
| 2003/0007653 | A1* | 1/2003 | Azima et al. | 381/152 |
| 2003/0007654 | A1* | 1/2003 | Azima | 381/152 |
| 2004/0189151 | A1 | 9/2004 | Athanas | |

FOREIGN PATENT DOCUMENTS

| EP | 0517114 | 12/1992 |
| WO | WO 9937121 | 7/1999 |
| WO | WO 0213575 | 2/2002 |

* cited by examiner

Primary Examiner — David Sample
(74) Attorney, Agent, or Firm — Oblon, Spivak, McClelland, Maier & Neustadt, L.L.P.

(57) ABSTRACT

A glazing comprising a sheet of glass, a film of damping material, and a rigid sheet, the assembly being laminated and comprising one or more exciters fastened to the glazing.

17 Claims, 3 Drawing Sheets

SOUND-GENERATING GLAZING

CROSS REFERENCE TO RELATED APPLICATIONS

This application is the entry into the United States of PCT Application Number PCT/EP2006/069372 filed Dec. 6, 2006 and claims priority from European Patent Application No. EP/05111774.5 filed Dec. 7, 2005, the entirety of each of which is hereby incorporated by reference.

BACKGROUND OF INVENTION

The present invention relates to glazing units used as sound generators.

Most audiovisual equipment available on the market (television sets, computers, mobile phones) comprise an image display screen and at least one sound generator. The display screen is usually coated with a protective glazing, customarily formed by a single or laminated glass panel. In the majority of cases the sound generator comprises one or more loudspeakers separated from the screen. The separated arrangement of the loudspeakers and the screen results in a bulky arrangement.

To reduce the bulkiness it has been proposed to use the screen itself as resonator, on which one or more exciters are mounted, the entire assembly forming the sound generator.

However, so far the practical implementation of such audiovisual screens has encountered numerous difficulties associated with the production of glazing exhibiting all the required qualities. Thus, in the "Magic Sound®" technology of Glas Platz GmbH & Co., the glazing is a glass panel with a thickness of scarcely 0.3 mm. The use of a glass panel with such a small thickness is determined by the acoustic properties of the glass. With respect to mechanical resistance, in particular impact resistance, it is not appropriate for the production of screens of large dimensions (computer or television screens).

In the "SoundVu" technology of NXT plc, it is proposed to produce the sound generating glazing from polymer material with suitable acoustic properties, in particular polycarbonate. However, in use such glazing units have very poor optical qualities and a poor mechanical resistance, primarily to scratches The invention aims to remedy the problems and disadvantages of known glazing units.

More particularly, the invention aims to provide a sound generating glazing that combines good acoustic properties, an excellent optical quality and good mechanical properties, in particular a good impact resistance and good scratch resistance.

SUMMARY OF INVENTION

The invention relates to a sound generating glazing comprising at least one glass sheet, a film of absorbent material attached to the glass sheet on one of its faces and to a sheet of a rigid material on its other face.

In the glazing according to the invention the glass sheet, the film of material attached to it and the sheet of rigid material are at least translucent. They are preferably transparent to light. They can be transparent to white light or to only one part of the spectrum of white light. In the majority of applications a transparency to white light is preferred.

In the following description, the term "light" is used to generally mean all or a fraction of the spectrum of white light.

The glazing according to the invention, which acts as a resonator, comprises at least one exciter fastened to the glass sheet or to the sheet of rigid material.

The exciter can be a piezoelectric type exciter, for example. It must have sufficient power to cause the glazing to vibrate. In principle, the exciter can be arranged at any location on the glazing. However, it is advantageous to arrange the exciter or exciters on the edge of the glazing. The use of several exciters distributed around the periphery is advantageous. The precise arrangement of these exciters on the periphery is selected in dependence on the resonance modes of the glazing.

Notwithstanding the conditions outlined above, the choice of exciter (or exciters) is not critical for the definition of the invention. Extra flat exciters are preferably used. Examples of extra flat exciters that conform favourably with the invention are those produced by NXT plc under the name "NXT SoundVu technology" and those produced by Glas Platz GmbH & Co. KG under the name "Magic Sound®" defined above.

According to the invention the panel is laminated and comprises at least one film made of an acoustically absorbent material.

The glazing constitutes the resonator. It vibrates under the action of the exciter generating audible sounds.

Consequently, the thickness of the glazing and particularly that of the glass sheet is an important parameter. It must be determined so that the glazing can vibrate under the action of the exciter to emit sounds of sufficient intensity.

The thickness of the glass sheet is dependent on its coincidence frequency. In practice, the aim is to move this towards treble frequencies of sound waves by reducing the thickness of the glass sheet. It is recommended that the thickness of the glass sheet should be selected so that its coincidence frequency is moved to beyond 6 (preferably 10) kHz. It is preferred to reduce the thickness of the glass sheet until its coincidence frequency is higher than the maximum frequency normally audible to the human ear (about 20 kHz). A thickness of less than 2 mm (preferably 1.5 mm) is therefore recommended. For considerations of mechanical resistance, it is recommended that the thickness of the glass sheet is more than 0.5 mm (preferably 0.8 mm). Thicknesses of 1 to 1.5 mm are particularly recommended.

The glass sheet must be at least translucent. It is preferably transparent to light.

The purpose of the film of the panel is to assure the acoustic quality of the panel. For this, it must be made of absorbent material.

In fact, it is necessary that the resonator formed by the laminated glazing that assures the mechanical qualities of the assembly can properly play its role of resonator.

Advantageously, the second sheet of rigid material of the laminated arrangement is a second glass sheet similar or identical to the first. It can also be a sheet of a synthetic material having the required optical characteristics of the complete glazing.

The laminated glazing is installed in screens with a glass sheet arranged to face the outside to best guarantee scratch resistance.

In practice, as regards a laminated arrangement composed of two glass sheets joined by means of a traditional interlayer sheet in safety glazing units, the usual interlayer sheet of the type made from PVB (polyvinyl butyral) does not provide the required characteristics. It is too rigid.

The absorption property of the film is generally defined by its acoustic absorption or loss factor, which indicates the amount of vibratory energy converted into heat, the theoretical maximum absorption factor being 100%.

In the glazing according to the invention, a film is advantageously selected in such a way that the acoustic absorption factor of the glazing is less than 80% (preferably 75%) at 200 Hz and at 20° C. It is recommended that the absorption factor is more than 5% (preferably 8%) at 200 Hz and at 20° C. Absorption factors of 10 to 50% are preferred.

The film having the required acoustic properties can also be defined by its viscoelastic characteristics, on which the absorption properties depend. The shear modulus is a parameter that expresses the viscoelasticity of the products considered.

These viscoelastic characteristics are also dependent on the temperature. For convenience, the shear modulus of the products considered according to the invention is defined at the temperature of 20° C.

The shear modulus for the frequency 200 Hz at the temperature 20° C. is advantageously less than $10^6$ Pa.

According to the invention it is preferred that the glazing provides an average absorption factor over the entire frequency range of 200 to 4400 Hz that is not less than 12%, and particularly preferred not less than 20%. Moreover, this average absorption must be achieved for the actual temperatures of use. In practice, for television screens, for instance, the usual temperatures vary between 20° and 40° C. The minimum average absorption must be assured over this entire temperature range.

The "average" absorption of the glazing determined for all frequencies from 200 to 4400 Hz for a given absorbent film preferably only varies to a limited degree in the range of useful temperatures. The variation in average absorption over the temperature range of 20° to 40° C. must not exceed 35% and preferably must be less than 25%.

The film must be translucent. It is preferably appreciably transparent to light.

Examples of usable materials for the film include ethylene-vinyl acetate copolymers and polyurethanes. In all laminated arrangements comprising two rigid sheets, in particular two sheets of glass, it is advantageous to use films made from polyvinyl butyral, in which the plasticity has been increased by adding plasticisers of the appropriate type and in the appropriate quantity. While in safety glazing units the plasticisation of the interlayer is restricted to maintain a significant mechanical resistance for the entire laminated arrangement, this requirement is not as significant in acoustic applications and the products can have a much higher plastic quality.

Films that can be used according to the invention are described in particular in patent publications EP 517 114, WO 01/19747.

It is also possible to use composite films comprising, for example, two standard PVB layers to adhere them to the glass sheets, these two layers sandwiching a layer of material that complies with the acoustic absorption characteristics of the invention. This layer can itself be made of "over-plasticised" PVB. Products of this type include, for example, those available from Sekisui under the name S-LEC. Layered products of this type are the subject of patent publications such as EP 457 190, EP 566 890 or EP 710 545.

The glazing according to the invention is used most frequently with a screen or an assembly for the purpose of displaying images. This screen-forming assembly can form the second rigid sheet of the glazing according to the invention so long as it lends itself to an assembly such as that used to form laminated glazing units.

Assembly can be achieved by utilising the thermoplastic qualities of the absorbent films. It is also possible to form the laminated arrangement using an appropriate resin, the cross-linkage of which is conducted directly between the rigid sheets: the glass sheet of the glazing, on the one hand, the second rigid sheet or the panel forming the screen. Products of this type are, for example, epoxy resins such as those used in sound insulation glazing units.

Notwithstanding the above-mentioned properties that it should have, the choice of the material of the rigid sheet is not critical for the definition of the invention.

Examples of usable materials for the rigid panel include in particular mineral or synthetic glasses such as polyacrylates or polycarbonates.

The dimensions of the glazing and its components (film, glass sheet, second rigid sheet) are not critical for the definition of the invention. They will depend on the applications the phonic glazing according to the invention is intended for.

In general, it is advantageous that the glazing has a total thickness of more than 1 mm in order to have a sufficient mechanical resistance. It is desirable to avoid excessive thickness for reasons of weight, bulkiness and cost. Thicknesses of less than 8 mm are recommended, those of 2.5 to 5 mm being preferred.

The glazing according to the invention can have any shape that is compatible with the ultimate destination of the glazing. It is generally flat, but can also have a shape that is curved around one or several axes.

The glazing according to the invention combines a series of properties hitherto considered to be incompatible. On the one hand, the glass sheet provides it with favourable optical and mechanical properties, in particular scratch resistance, and its combination with the film made of acoustically absorbent material provides it with good acoustic properties. On the other hand, the glazing formed from the glass sheet and the film in association with the second sheet or the panel of a screen assures favourable mechanical resistance.

The sound generating glazing according to the invention has various applications in the production of image display devices such as screens for televisions, portable computers, mobile phones, home cinema equipment or physical and/or chemical analysis equipment. It also has applications as both protective and sound generating "communicating" glazing (for music or vocal data) in particular for glazing units for businesses or museums, bus shelters, ceilings, mirrors or ornamental glasses, advertising panels or partitions, image frames, loudspeakers . . . (open list).

Therefore, the invention also relates to an image display screen, which is characterised in that it comprises a sound generating glazing according to the invention as defined above. According to the invention, the expression "display screen" indicates any screen capable of carrying an image. The term "image" has a broad definition and relates not only to the graphic representation of objects, but also to alphabetic letters and symbols.

For example, the screen according to the invention can comprise a sheet or a panel, on which an image has been drawn and/or painted.

In another example in accordance with the invention, the screen comprises a sheet or panel of uniform colour (white, for example) intended to receive an image projected from a suitable projector or support of elements generating this image.

The invention more particularly relates to display screens of the type defined above that are intended for installation in image generators selected from physical or chemical analysis equipment, televisions, computers and mobile phones.

In this application of the invention, the screen comprises, for example, a panel coated with a fluorescent film to equip a cathode tube or a panel bearing a liquid crystal assembly such as is well known in production techniques for computers and televisions.

The sound generating glazing according to the invention can also be applied in the building industry, where it can serve as glazing for windows, in particular display windows for shops, hotels or restaurants (open list).

Therefore, the invention also relates to the use of the glazing according to the invention as a transparent glazing of a building.

BRIEF DESCRIPTION OF THE DRAWINGS

The special features and details of the invention will become evident from the following description of the attached figures, wherein.

DETAILED DESCRIPTION

A glazing according to the invention is given the overall reference 1. The glazing 1 is applied to a screen 2 of a portable computer, shown shaded, so as to cover it completely. The screen 2 is a liquid crystal screen, for example, as is well known in the production technology of computers and computer monitors. The panel forming the front face of the screen is made of glass or a translucent plastic material, for example.

Figure 1:
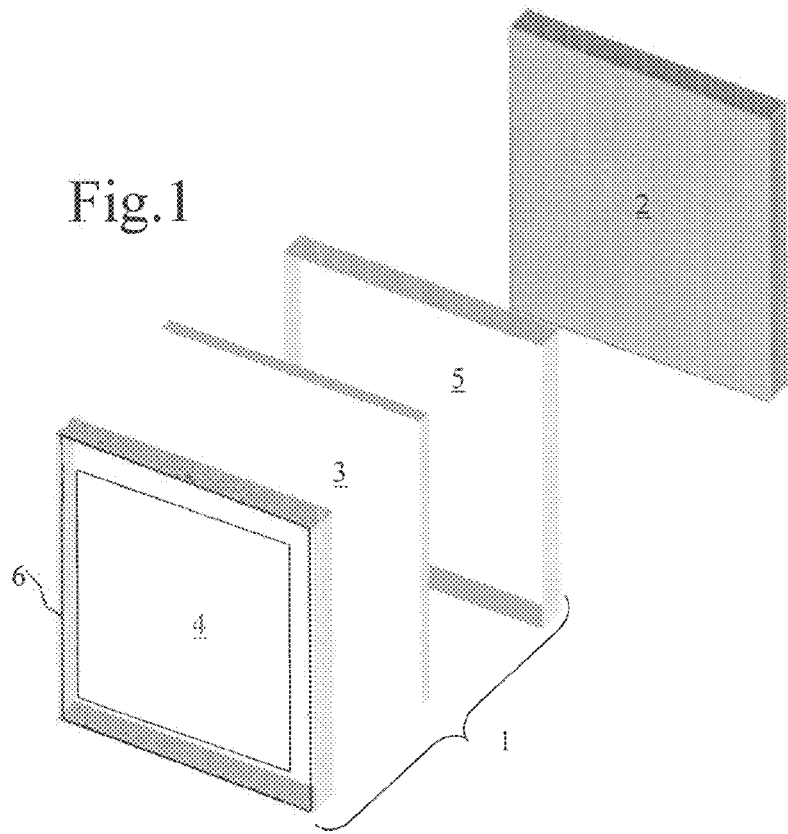
FIG. 1 is a schematic perspective exploded view of a particular practical example of the glazing according to the invention.

In the example in FIG. 1, the glazing 1 comprises a flat film 3 sandwiched between a glass sheet 4 and a glass sheet 5. The glass sheet 5 is flat and essentially has the same dimensions as the screen 2. It can be applied directly against the screen 2. As a variant, the glass panel 5 can be held slightly spaced from the screen 2 by an interlayer frame (not shown). The glass panel 5 can have the same thickness as the sheet 4 or have a more substantial thickness than this, its main role being to provide the assembly with the required mechanical properties, particularly when the sheet 4 is very thin.

The glass sheet 4 is flat and has the same dimensions as the panel 5. It is surrounded by a frame 6, in which piezoelectric exciters (not shown) are inserted. These piezoelectric exciters are known for causing the glass sheet 4, and the glazing assembly in general (glass sheet 4, absorbent film 3, second rigid sheet 5), to vibrate in a manner capable of emitting sound waves in the audible spectrum (from about 20 Hz to 20 kHz). The glass sheet 4 has a thickness of about 1.1 mm, for example.

The exciters are in contact with one of the faces of sheet 4. They are arranged either between the frame 6 and sheet 4, in which case they are set in place after lamination of the assembly of the two sheets 4 and 5 and the absorbent sheet 3, or on the face that is in contact with sheet 3. In this case, insertion can be performed before lamination so long as the exciter or exciters in question are of a thickness compatible with this assembly. It is also possible to provide seatings in sheet 3 for these exciters, preferably before proceeding with lamination.

Alternatively, the exciters can be fastened to the rigid sheet 5.

The film 3 is sandwiched between the glass sheet 4 and the glass sheet 5. It is made from an acoustically absorbent polymer material that has an acoustic loss factor of about 0.3. Moreover, it must be transparent to white light.

The film 3 can be made, for example, of a ethylene-vinyl acetate copolymer and have a thickness of 0.4 to 0.8 mm.

In a variant of the glazing shown in FIG. 1, the film 3 is made of polyurethane and its thickness is about 0.7 to 0.8 mm.

In another variant of the glazing shown in FIG. 1, the rigid panel 5 is made of polycarbonate and its thickness is about 1 mm.

In the glazing shown in FIG. 1, the glass sheet 4 provides the glazing with a high scratch resistance and good optical properties. The combination of the glass sheet 4 (of low thickness), the absorbent film 3 and the rigid glass sheet 5 provides the glazing with good acoustic properties and assures mechanical resistance of the glazing 1.

Figure 2:
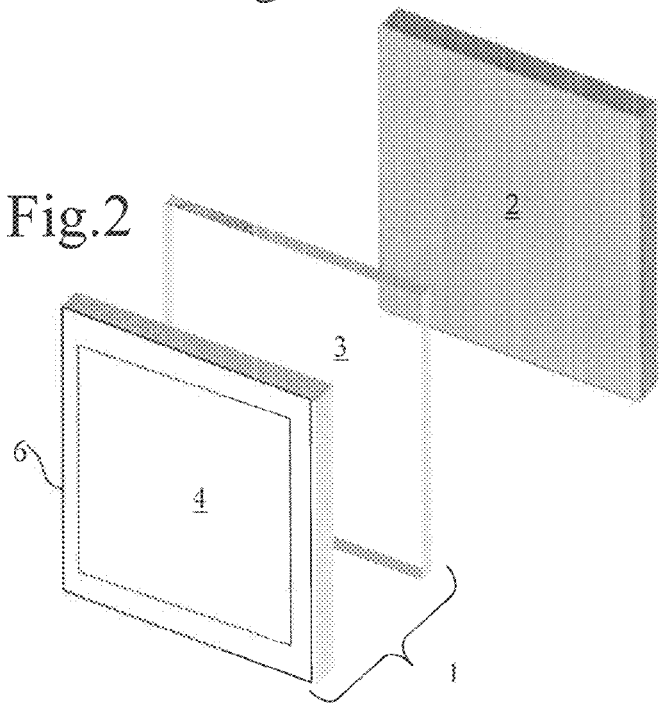
FIG. 2 is a representation similar to that of FIG. 1 of a second practical example of the invention.

The variant of FIG. 2 has the component elements of a glazing, in which the glass sheet 4 is attached to the film of acoustically absorbent material and is fastened directly to the panel forming the screen 2. In this practical example in particular the formation of the film 3 from a resin that is cross-linked in situ between the glass sheet 4, on the one hand, and the screen 2, on the other, is advantageous in that it can be achieved without any assembly operation requiring an increase in temperature, since this is not generally possible with the electronic components of the screens in question.

Different absorbent films (A, B, C) have been tested for their properties at temperatures from 20° to 40° C. These films have been included in a laminated assembly formed from two glass sheets, each with a thickness of 1.1 mm. Films A and C have a thickness of 0.76 mm. Film B is 0.50 mm thick.

The technique used for measurement of the absorption is that described with respect to standard ISO/PAS 16940. The particular conditions are indicated below.

Figure 5:
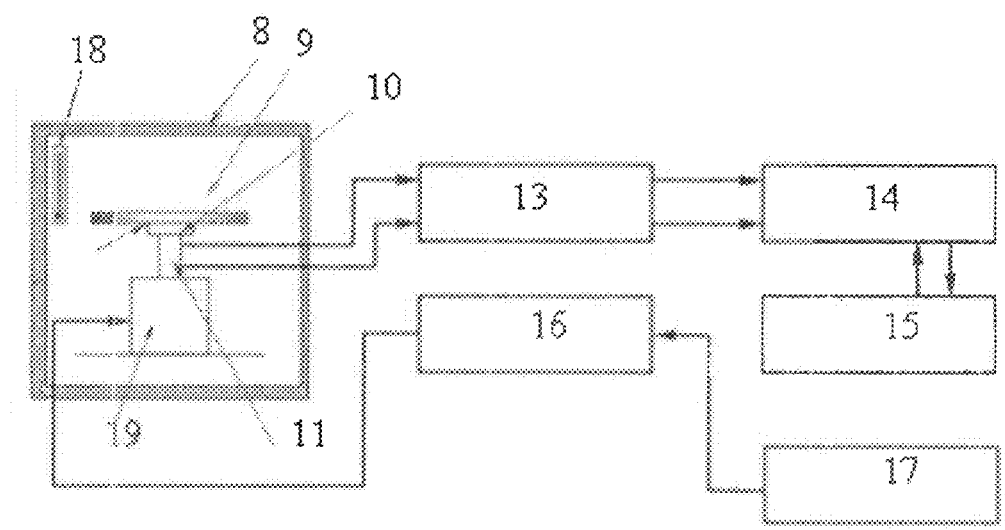
FIG. 5 is a diagram of the device used to measure absorption.

The equipment used is shown schematically in FIG. 5. The analysed sample 9 inserted into the temperature-controlled chamber 8 (temperature control 18) is supported at its centre by support 10. It is fastened to this by gluing 12. Excitation is transmitted to the sample 9 by the vibrator 19 and via the support 10.

The circuit comprises a noise generator 17, a power amplifier 16 and an impedance head 11. The analysis is performed by means of an impedance measuring amplifier 13 associated with an FFT analyser 14 and a calculation system 15.

The tested samples consist of 230×12 mm laminated test pieces, the total thicknesses of which are dependent on the type of absorbent film. The sample is subjected to vibratory excitation (Bruel & Kjaer type 4810 vibrator) operating in "white noise" mode (Bruel & Kjaer type 1405 noise generator). Under the effect of the excitation, the mechanical impedance of the sample is measured (Bruel & Kjaer type 8001 impedance head) and the different resonant frequencies are determined (ONO SOKKI type CF-910 frequency analyser).

The absorption η is determined by the equation:

$$\eta = \Delta f_n / f_n$$

where $f_n$ is the resonant frequency considered and $\Delta f_n$, is the width of the resonance curve at −3 dB.

Measurement is conducted for the entire range of frequencies from 200 to 4500 Hz. The obtained values are averaged.

The measurements are made at temperatures that represent modes of operation customary in usual operating conditions of television type screens. Three series of measurements are made at 20°, 30° and 40° C. respectively.

The absorbent films tested are respectively a polyvinyl butyral film traditionally used in applications of laminated glazing units intended for the building sector and two films known to be used in sound insulation glazing units.

The laminated test piece made of traditional PVB, designated A, does not exhibit acoustic qualities. It is relatively rigid. The film of the tested glazing sample designated B is a composite formed from two PVB films of reduced thickness separated by a film having a plasticity substantially higher than that of PVB. The film designated C is formed from a PVB that is highly plasticised as a result of the addition of plasticising constituents.

Figure 3:
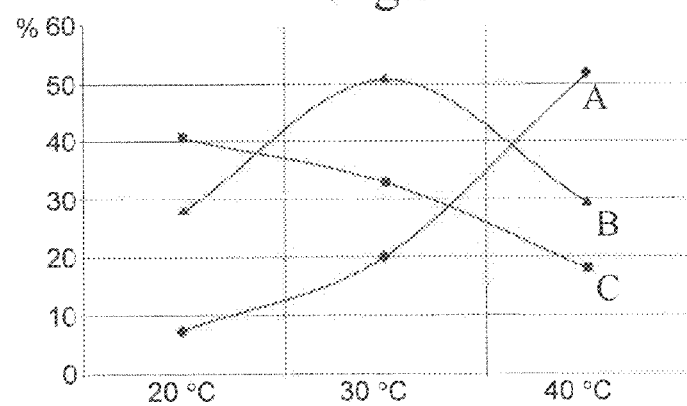
FIG. 3 is a graph showing the average absorption (in per cent) as a function of temperature for three materials.

The measurement results are recorded as a function of temperature and frequency in the following tables marked A, B and C. A final table indicates the average absorption value at the different temperatures. The results are also shown in FIG. 3 indicating the absorption as a function of temperature.

It can be seen in this Figure that the absorption factor for the sample made of traditional PVB is relatively low at the temperatures considered. It only becomes significant at higher temperatures. The two other products provide an appreciably higher absorption that, in contrast to the previous product, decreases when the temperature rises significantly. In the range from 20° to 40° C., these two products meet the general conditions of the invention.

| Temperature | Frequency | Absorption |
|---|---|---|
| A | | |
| 20° C. | 290 Hz | 4.7% |
| 20° C. | 1410 Hz | 7.0% |
| 20° C. | 3237 Hz | 10.9% |
| 30° C. | 275 Hz | 8.3% |
| 30° C. | 1295 Hz | 22.6% |
| 30° C. | 2900 Hz | 29.3% |
| 40° C. | 235 Hz | 47.6% |
| 40° C. | 930 Hz | 55.9% |
| 50° C. | 160 Hz | 37.9% |
| 50° C. | 645 Hz | 30.9% |
| 50° C. | 1470 Hz | 32.0% |
| 50° C. | 2850 Hz | 38.6% |
| 60° C. | 135 Hz | 15.2% |
| 60° C. | 565 Hz | 10.4% |
| 60° C. | 1380 Hz | 8.0% |
| 60° C. | 2575 Hz | 8.4% |
| 60° C. | 4162 Hz | 8.2% |
| 80° C. | 125 Hz | 9.1% |
| 80° C. | 545 Hz | 3.1% |
| 80° C. | 1340 Hz | 2.0% |
| 80° C. | 2512 Hz | 1.7% |
| 80° C. | 4050 Hz | 1.3% |
| B | | |
| 20° C. | 215 Hz | 32.6% |
| 20° C. | 880 Hz | 48.3% |
| 30° C. | 200 Hz | 28.6% |
| 30° C. | 790 Hz | 37.0% |
| 40° C. | 170 Hz | 22.3% |
| 40° C. | 660 Hz | 17.7% |
| 40° C. | 1545 Hz | 15.4% |
| 40° C. | 2862 Hz | 16.2% |
| 50° C. | 150 Hz | 20.0% |
| 50° C. | 625 Hz | 10.8% |
| 50° C. | 1480 Hz | 5.7% |
| 50° C. | 2750 Hz | 6.1% |
| 50° C. | 4412 Hz | 5.6% |
| 60° C. | 135 Hz | 10.9% |
| 60° C. | 590 Hz | 6.1% |
| 60° C. | 1440 Hz | 3.7% |
| 60° C. | 2700 Hz | 3.2% |
| 60° C. | 4325 Hz | 2.8% |
| 80° C. | 130 Hz | 9.6% |
| 80° C. | 580 Hz | 3.1% |
| 80° C. | 1420 Hz | 1.5% |
| 80° C. | 2662 Hz | 1.4% |
| 80° C. | 4287 Hz | 1.2% |
| C | | |
| 20° C. | 265 Hz | 16.1% |
| 20° C. | 1175 Hz | 30.0% |
| 20° C. | 2637 Hz | 37.5% |
| 30° C. | 220 Hz | 46.5% |
| 30° C. | 900 Hz | 55.0% |
| 40° C. | 150 Hz | 36.9% |
| 40° C. | 635 Hz | 29.2% |
| 40° C. | 1495 Hz | 24.2% |
| 40° C. | 2800 Hz | 26.8% |
| 50° C. | 130 Hz | 15.0% |
| 50° C. | 565 Hz | 9.2% |
| 50° C. | 1380 Hz | 7.5% |
| 50° C. | 2587 Hz | 7.3% |
| 50° C. | 4175 Hz | 7.1% |
| 60° C. | 125 Hz | 10.3% |
| 60° C. | 550 Hz | 3.8% |
| 60° C. | 1355 Hz | 2.8% |
| 60° C. | 2550 Hz | 2.7% |
| 60° C. | 4100 Hz | 1.9% |
| 80° C. | 125 Hz | 11.0% |
| 80° C. | 545 Hz | 2.8% |
| 80° C. | 1345 Hz | 1.3% |

Average absorption at temperatures of use.

| ° C. | A | B | C |
|---|---|---|---|
| 20.0 | 7.5% | 40.5% | 27.9% |
| 30.0 | 20.1% | 32.8% | 50.8% |
| 40.0 | 51.8% | 17.9% | 29.3% |

The absorption of the products comprising films B and C is clearly higher than 12% in all conditions and is higher than 20% for the most usual temperature conditions. Moreover, for each of these glazing units B and C the absorption as a function of temperature does not vary more than 35% and even remains below 25%.

Figure 4A:
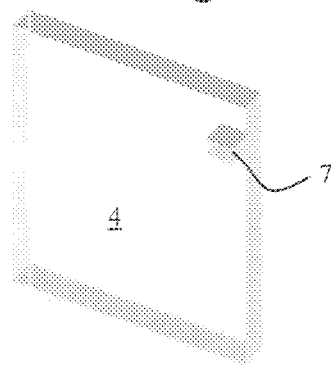
FIGS. 4a and 4b shows two arrangements for positioning the exciter in relation to the glazing forming the resonator.
Figure 4B:
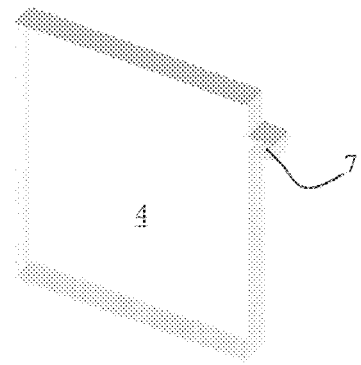

FIGS. 4a and 4b show two possible types of construction. These two representations differ in the positioning of the exciter 7 relative to the glass sheet 4. The figures only show one exciter in each case. In fact, the glazing units according to the invention can each have several exciters. This is useful in particular since the resonance of the sheet depends on the positioning of the exciter relative thereto.

As shown, the exciter 6, or one of them, can be arranged on a face of sheet 4 (FIG. 4a). In the same way, it is possible to arrange one or more exciters on the edge of the sheet 4. This latter arrangement has some advantages from the acoustic point of view and moreover allows the glass sheet to be completely detached from any element that masks the presence of these exciters.

FIGS. 4a and 4b show the exciter fastened to the glass sheet 4 and these can also be fastened to the associated rigid sheet 5. The choice is partly dependent at least on the ease of positioning these exciters in relation to the glazing, but also takes into account the special features of resonating the glazing.

The invention claimed is:
1. A sound generating glazing, comprising:
a glass sheet,
a film of absorbent material, and
a rigid sheet, wherein the glass sheet, the film, and the rigid sheet are laminated, an exciter is fastened to the glazing, the film comprises a layer comprising at least one material selected from the group consisting of an ethylene-vinyl acetate copolymer, a polyurethane, a polyacetal, and an epoxy resin, and the layer has a shear modulus of less than $10^6$ Pa for a frequency of 200 Hz at a temperature of 20° C.

2. The glazing of claim 1, wherein the glazing has an absorption factor of less than 80% at 200 Hz and at 20° C.

3. The glazing of claim 2, wherein the absorption factor is from 10 to 50%.

4. The glazing of claim 1, wherein the glazing has an absorption averaged over a frequency range from 200 to 4400 Hz of more than 12% for temperatures from 20° to 40° C.

5. The glazing of claim 4, wherein the glazing has an absorption averaged over the frequency range from 200 to 4400 Hz of more than 20% for temperatures from 20° to 40° C.

6. The glazing of claim 4, wherein a variation of the absorption averaged over the frequency range as a function of temperature remains less than 35% in absolute value over a temperature range of 20° to 40° C.

7. The glazing of claim 6, wherein the variation of the absorption averaged over the frequency range as a function of temperature remains less than 25% in absolute value over the temperature range of 20° to 40° C.

8. The glazing of claim 1, wherein the film is a composite comprising at least two layers.

9. The glazing of claim 1, wherein a thickness of the glass sheet is such that the glass sheet has a coincidence frequency higher than 10 kHz.

10. The glazing of claim 9, wherein the thickness of the glass sheet is less than 2 mm.

11. The glazing of claim 10, wherein the thickness of the glass sheet is more than 0.8 mm.

12. The glazing of claim 11, wherein the thickness of the glass sheet is from 1 to 1.5 mm.

13. The glazing of claim 9, wherein a thickness of the glazing is more than 2 mm.

14. The glazing of claim 13, wherein the thickness of the glazing is from 2.5 to 5 mm.

15. The glazing of claim 14, wherein the thickness of the glass sheet is from 1 to 1.5 mm, a thickness of the film is from 0.3 to 1 mm, and a thickness of the rigid sheet is from 1 to 1.5 mm.

16. An image display screen coated with a phonic glazing, wherein the phonic glazing is the glazing of claim 1.

17. The screen of claim 16, wherein the screen is suitable for installation in an image generator, and the image generator is a physical analyzer, a chemical analyzer, a television, a computer, or a mobile phone.

* * * * *